United States Patent [19]

Zeitlow

[11] 4,357,027
[45] Nov. 2, 1982

[54] MOTOR VEHICLE FUEL TANK

[75] Inventor: Ronald A. Zeitlow, Fort Wayne, Ind.

[73] Assignee: International Harvester Co., Chicago, Ill.

[21] Appl. No.: 228,412

[22] Filed: Jan. 26, 1981

Related U.S. Application Data

[63] Continuation of Ser. No. 49,718, Jun. 18, 1979, abandoned.

[51] Int. Cl.³ ........................ B60K 15/02; B60K 15/04
[52] U.S. Cl. .................................... 280/5 A; 220/5 A; 220/76; 220/86 R
[58] Field of Search ...................... 280/5 A, 5 R, 5 H; 220/5 R, 5 A, 76, 86 R

[56] References Cited

U.S. PATENT DOCUMENTS

| | | | |
|---|---|---|---|
| 2,145,759 | 1/1939 | Fellows et al. | 220/86 R |
| 2,180,185 | 11/1939 | Weiss | 220/86 R |
| 2,806,622 | 9/1957 | Leirer | 220/5 A |
| 3,006,358 | 10/1961 | Hildebrandt et al. | 280/5 A |
| 3,067,829 | 12/1962 | Klemm | 280/5 A |
| 3,227,410 | 1/1966 | McCuen | 280/5 H |
| 3,884,255 | 5/1975 | Merkle | 280/5 A |
| 3,896,964 | 7/1975 | Takei | 280/5 A |
| 3,931,907 | 1/1976 | Henle | 280/5 A |
| 4,013,300 | 3/1977 | Berger | 280/5 A |
| 4,214,767 | 7/1980 | Davies | 280/5 A |

Primary Examiner—John A. Pekar
Attorney, Agent, or Firm—F. J. Krubel; F. D. Au Buchon

[57] ABSTRACT

A liquid fuel tank assembly which has upper and lower body shells connected together along continuous bent flanges, and has a recessed and shielded fill neck and cap locking cam integral with the upper body shell and an extruded sump portion integral with the lower body shell.

6 Claims, 6 Drawing Figures

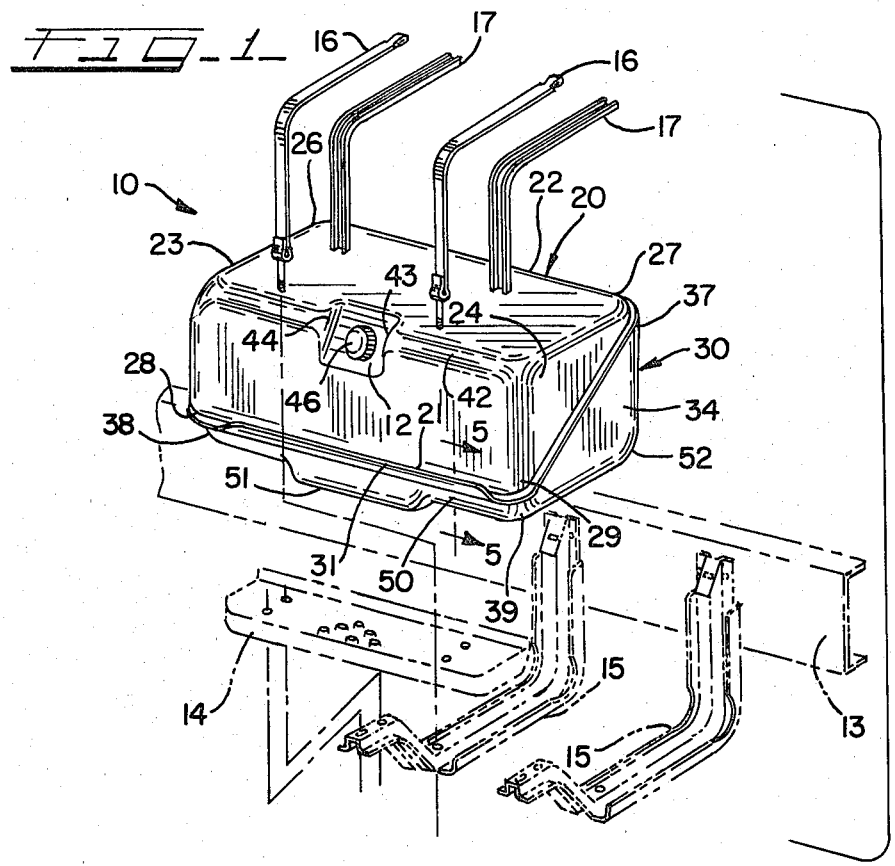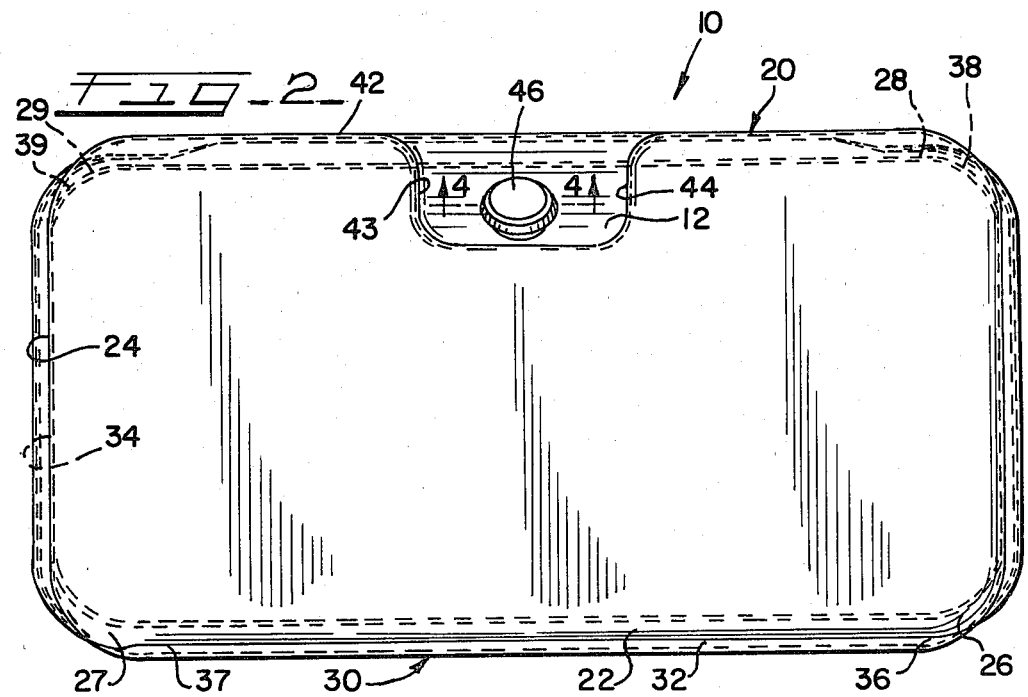

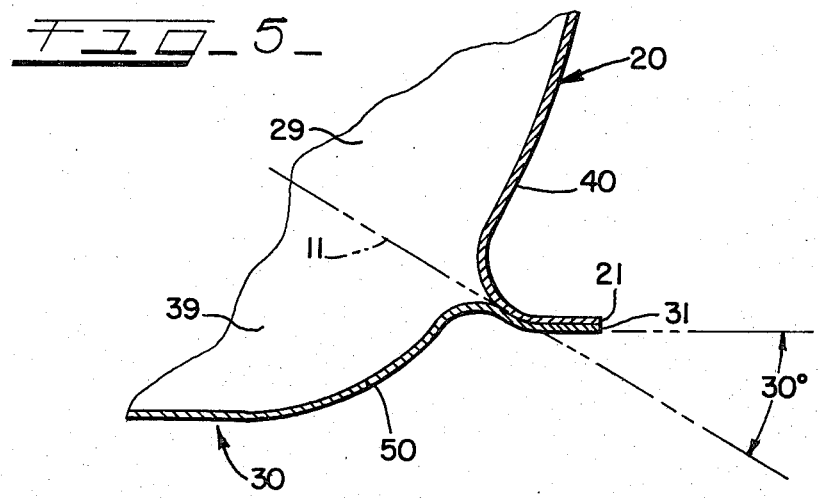
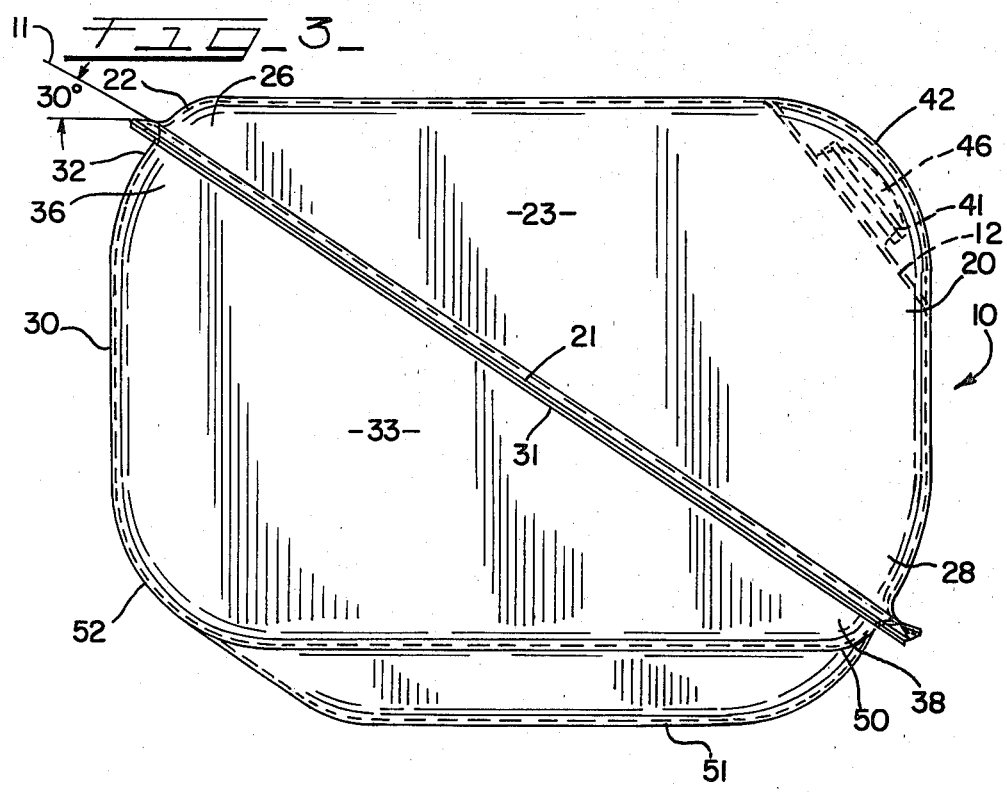

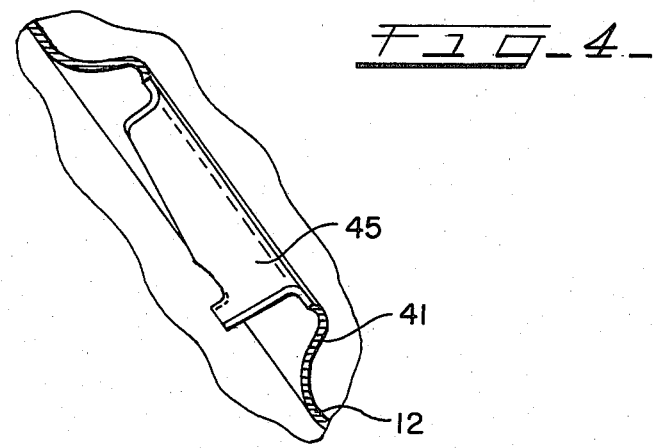
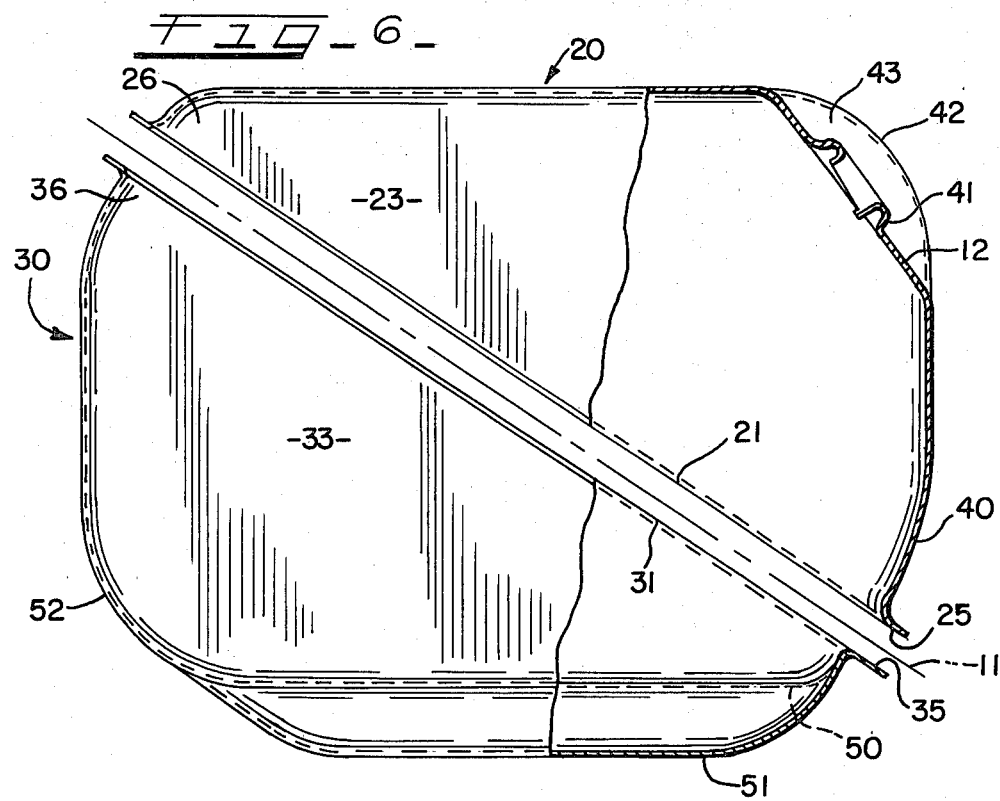

MOTOR VEHICLE FUEL TANK

This is a continuation of application Ser. No. 049,718, filed June 18, 1979, now abandoned.

FIELD OF THE INVENTION

This invention relates to automotive vehicles, and particularly to an improved liquid fuel tank.

DESCRIPTION OF THE STATE OF THE ART

Heretofore, liquid fuel tanks, of the stamped sheet metal type shown in U.S. Pat. No. 2,806,622—Leirer—Sept. 17, 1957, U.S. Pat. No. 3,014,730—Cole—Dec. 26, 1961, U.S. Pat. No. 3,294,278—Madden et al—Oct. 20, 1964, U.S. Pat. No. 3,687,335—Hunter—Aug. 29, 1972 and U.S. Pat. No. 3,968,896—Giacoletti et al—July 13, 1976, had the fill pipe as a separate part fitted into an opening in the upper dished portion of the tank and connected thereto; and the continuous outwardly extending connecting flanges, by which the upper and lower dished portions were connected together, were only bent in certain places for purposes of mounting clearance and to prevent lateral shifting of the tank holddown straps encircling the tank.

SUMMARY OF THE INVENTION

The object of the invention is to provide a stronger and greater leak resistant fuel tank comprising stamped upper and lower body shells, which are connected together along matching external flanges. A fill neck, having a cap locking cam, is stamped and recessed into a top edge portion of the upper body shell as an integral part thereof. The lower body shell has an extruded sump portion, at the bottom, as an integral part thereof. And, the connected flanges have the termini bent at a predetermined angle with respect to an oblique plane passing through the fuel tank between the connected flanges, prior to bending of the flanges.

The fill neck, which is stamped and recessed into a top edge portion of the upper body shell, adds rigidity to this stamping and the recess shields the fill neck and the cap locking cam; the sump, which is extruded into the bottom of the lower body shell adds rigidity to this stamping and prevents the shifting of the tank when mounted between two identical spaced apart brackets which are connected to a frame member of the vehicle; and, the bent continuous flanges add to the strength of the assembled fuel tank and offer greater resistance to leakage and collapse of the tank along the seam.

The termini of the flanges are bent at substantially thirty degrees to the oblique plane so that the flanges extending across the top and bottom edge portions lie on two parallel horizontal planes intersecting the oblique plane, the upper flanges bending downwardly at thirty degrees and the lower flanges bending upwardly at thirty degrees, and the downwardly bends extending around the upper corners of the upper body shell and obliquely downwardly along the lateral sides and around the lower corners of the lower body shell and merging into the upwardly bend.

BRIEF DESCRIPTION OF THE DRAWING

FIG. 1 is a perspective view of the liquid fuel tank with parts for installation under a motor truck cab;

FIG. 2 is a top view of the liquid fuel tank shown in FIG. 1;

FIG. 3 is a rear view of the liquid fuel tank with respect to the direction of travel of the vehicle;

FIG. 4 is a cross-sectional view of the integral fill neck and cap locking cam, with the cap removed, taken on lines 4—4 of FIG. 2;

FIG. 5 is a cross-sectional view of the bottom flange taken on lines 5—5 of FIG. 1; and FIG. 6 is a partial cross-sectional view similar to FIG. 3 prior to assembly of the upper and lower body shells.

DESCRIPTION OF THE PREFERRED EMBODIMENT

In FIG. 1, there is shown a fuel tank assembly 10 which is adapted for mounting on two identical brackets 15—15 which are connected to a frame member 13 of a motor truck (not shown). Two identical straps 16—16 and gaskets 17—17 secure the tank assembly 10 to the brackets 15—15. A step 14 is mounted on the ends of the brackets 15—15 for the driver's convenience in gaining access and egress from the cab (not shown).

The fuel tank assembly 10, as shown in FIGS. 1-3, comprises an upper body shell 20 and a lower body shell 30, which are connected together, fluid tight, along respective and matching, continuous external flanges 21 and 31. The continuous flanges 21 and 31, which extend horizontally across the top cab side edge portion 22-32, and around the top cab side corners 26-36 and 27-37, and obliquely downwardly and outwardly along the vehicle forward and rearward 24-34 and 23-33 sides, respectively, and around the bottom outside corners 28-38 and 29-39, respectively of the upper and lower body shells 20-30, are bent downwardly, approximately 30 degrees with respect to an oblique plane 11, (see FIGS. 3, 5 and 6), passing between the contacting or matching surfaces 25 and 35 (FIG. 6) of the continuous flanges 21 and 31 prior to bending. The outside horizontal portion of the continuous flanges 21,31 running across the bottom outside edge portion 40-50, respectively, of the upper and bottom body shells 20-30 are bent upwardly, at approximately thirty degrees with respect to the oblique plane 11, as shown in FIGS. 3 and 5.

The upper body shell 20, as shown in FIGS. 3, 4 and 6, has a fill neck 41 which is integral with a recessed surface 12 formed in the top outside edge portion 42 and is shielded by the stamped forward and rearward walls 43 and 44. As shown in FIGS. 4 and 6, a cap locking cam 45 is also formed integral with the integral fill neck 41. A cap 46 is mounted on the fill neck 41, and, as shown in FIGS. 1-3, is, also shielded deep within the forward and rearward walls 43-44 of the recess.

The lower body shell 30 has an extruded sump portion 51 which extends from the bottom cab side edge portion 52 to the bottom outside edge portion 50, and nests between the two spaced apart brackets 15—15 to prevent forward and rearward shifting of the tank.

It is to be noted that the terms "horizontally", "forward", "rearward", "cab side", "outside", "oblique", "upper", "lower", and the like, are used in the sense of the normal position of the fuel tank assembly 10 mounted as shown in FIG. 1 of the drawing.

The embodiments of the invention in which an exclusive property or priviledge is claimed are defined as follows:

1. In a motor truck having a longitudinally extending side frame member supporting a motor truck cab, a pair of longitudinally spaced apart fuel tank support arm brackets mounted to the frame member and extending laterally outwardly therefrom below the cab, and a liquid fuel tank mounted to the support arm brackets in overhanging relation with the frame member, and comprising:

upper and lower tank body shells seam connected together along continuous external projecting flanges;

the lower tank shell having a depending sump portion means extruded in a horizontal bottom wall and nesting between the brackets for preventing fore-and-aft shifting of the tank;

the upper tank shell having an indented flat portion notching an outboard edge formed by the juncture between a horizontal top wall and an outboard vertical side wall and extending into said top and outboard side walls and forming two opposed shoulders of an alcove;

a fuel filler neck extruded in the flat portion between the shoulders and forming an opening to the tank;

a cap locking cam formed on the extruded end of the tube; and a cap mounted over the extruded end of the neck and detachably secured thereto by the cam and shieldably recessed in the alcove.

2. In a motor truck side frame member mounted liquid fuel tank, according to claim 1, wherein the tank is connected to the brackets by a pair of longitudinally spaced apart straps passing over the upper tank shell and the downwardly over the outboard side wall, and wherein the alcove is located centrally between the straps.

3. In a motor truck side frame member mounted liquid fuel tank according to claim 1 or 2, wherein the upper and lower tank body shells are substantially trapezoidal in shape with the projecting flanges extending on an oblique plane intersecting with two parallel horizontal planes respectively passing through the top and bottom walls, and wherein the seam connected flanges have a predetermined bend mode extending around the vertical walls of the tank and providing a greater resistance to leakage and collapse of the tank along the seam connection.

4. In a motor truck side frame member mounted liquid fuel tank according to claim 3, wherein, the brackets are crooked upwardly and outwardly and the predetermined bend extending along the outboard side wall is adjacent to the crooked brackets and is bent upwardly and outwardly wedgingly engaging in the crooks of the brackets.

5. In a motor truck side frame member mounted liquid fuel tank according to claim 4, wherein the predetermined bend extending along the remaining vertical walls is bent downwardly and outwardly.

6. In a motor truck side frame member mounted liquid fuel tank according to claim 5, wherein the seam connected flanges are bent at a substantially thirty degree angle with respect to the oblique plane.

* * * * *